United States Patent
Rune et al.

(10) Patent No.: US 7,016,310 B2
(45) Date of Patent: Mar. 21, 2006

(54) DERIVING CONTROL PARAMETERS FOR TELECOMMUNICATIONS IN-AND-OUT-OF-SYNCHRONIZATION DETECTION

(75) Inventors: Göran Rune, Linköping (SE); Bo Nyberg, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 817 days.

(21) Appl. No.: 09/812,937

(22) Filed: Mar. 27, 2001

(65) Prior Publication Data

US 2002/0012321 A1    Jan. 31, 2002

Related U.S. Application Data

(60) Provisional application No. 60/194,699, filed on Apr. 5, 2000.

(51) Int. Cl.
    *H04J 3/14*    (2006.01)
(52) U.S. Cl. .................. 370/252; 370/331; 370/350; 455/442
(58) Field of Classification Search .............. 370/242, 370/330, 352, 503, 328, 331, 334, 342, 252, 370/350; 455/436, 442
    See application file for complete search history.

(56) References Cited

U.S. PATENT DOCUMENTS

| | | | | |
|---|---|---|---|---|
| 5,008,953 | A | * | 4/1991 | Dahlin et al. ............... 455/423 |
| 5,375,253 | A | * | 12/1994 | Lopponen ................... 455/517 |
| 5,497,504 | A | | 3/1996 | Acampora et al. |
| 5,530,917 | A | | 6/1996 | Andersson et al. |
| 5,933,787 | A | * | 8/1999 | Gilhousen et al. .......... 455/438 |
| 5,959,983 | A | * | 9/1999 | Saito et al. ................. 370/337 |
| 6,233,222 | B1 | | 5/2001 | Wallentin |
| 6,415,149 | B1 | * | 7/2002 | Bevan et al. ................ 455/442 |
| 6,456,826 | B1 | * | 9/2002 | Toskala et al. ............. 455/63.1 |
| 6,618,432 | B1 | * | 9/2003 | Ganesh ....................... 375/147 |
| 6,757,270 | B1 | * | 6/2004 | Kumar et al. ............... 370/342 |

FOREIGN PATENT DOCUMENTS

| | | |
|---|---|---|
| WO | 95/08898 | 3/1995 |
| WO | 95/15665 | 6/1995 |
| WO | 95/20865 | 8/1995 |
| WO | 97/41698 | 11/1997 |
| WO | 99/41850 | 8/1999 |

(Continued)

OTHER PUBLICATIONS

3GPP TS 25.214, version 3.4.0, 3Generation Partnership Project, Technical Specification Group Radio Access Network, Physical Layer Procedures (FDD), Release 1999, 9-200.

(Continued)

*Primary Examiner*—Alpus H. Hsu
*Assistant Examiner*—Clemence Han
(74) *Attorney, Agent, or Firm*—Nixon & Vanderhye P.C.

(57) ABSTRACT

In accordance with the present invention, the control parameters for an in-and-out-of-synchronization detection algorithm (102) for a radio link set (set of combined radio links) are derived by a function (106) from the corresponding cell-based parameters. There are various modes of the method on how the control parameters for the in-and-out-of-synchronization detection algorithm for a radio link set (set of combined radio links) can be derived from the corresponding cell based parameters. For example, it could either be done dynamically, i.e. when a radio link is either added to or removed from a radio link set, or semi-statically, i.e. whenever the control parameters are changed for any cell in a base station, or in a combination of the dynamic and semi-static ways.

4 Claims, 13 Drawing Sheets

FOREIGN PATENT DOCUMENTS

WO    00/60892    10/2000

OTHER PUBLICATIONS

U.S. Appl. No. 09/035,821, filed Mar. 6, 1998, entitled "Telecommunications Inter-Exchange Measurement Transfer".

Cheung, et al, "Network Configurations for Seamless Support of CDMA Soft Handoffs Between Cell-Clusters", Dept. of Electrical Engineering, The University of British Columbia, 0-7803-3300-Apr.1996 ©1996, pp. 295-299.

Jones, et al., IS-634 revision A—part 1 (IS-634. 1 rev A) (PN-3539) 2nd Ballot Version—Draft for V&V, Part 1—Common Protocol and Part 5—Protocol Details, Oct. 27, 1997.

"Digital Cellular Telecommunications System (Phase 2+); Mobile Application Part (MAP) Specification (GSM) 09.02 vesion 5.8.0)", European Telecommunications Standard Institute; Draft pr ETS 300 974, Feb. 1998.

"Cellular Radiotelecommunications Intersystem Operations", ANSI-41-D (Former (TIA/EIA IS-41-C), pp. 2-5—2-14, 2-25—-2-30.

Simmons et al., "Switching Handovers in Microcellular Mobile Networks: An Architectural Evolution", Proceedings of the International Switchng Symposium, Yokohama, Oct. 25-30, 1992, vol. 1, No. SYMP. 14, 25 Oct. 1992, pp. 108-112, XP000337626 Institute of Electronics; Information and Communication Engineers.

* cited by examiner

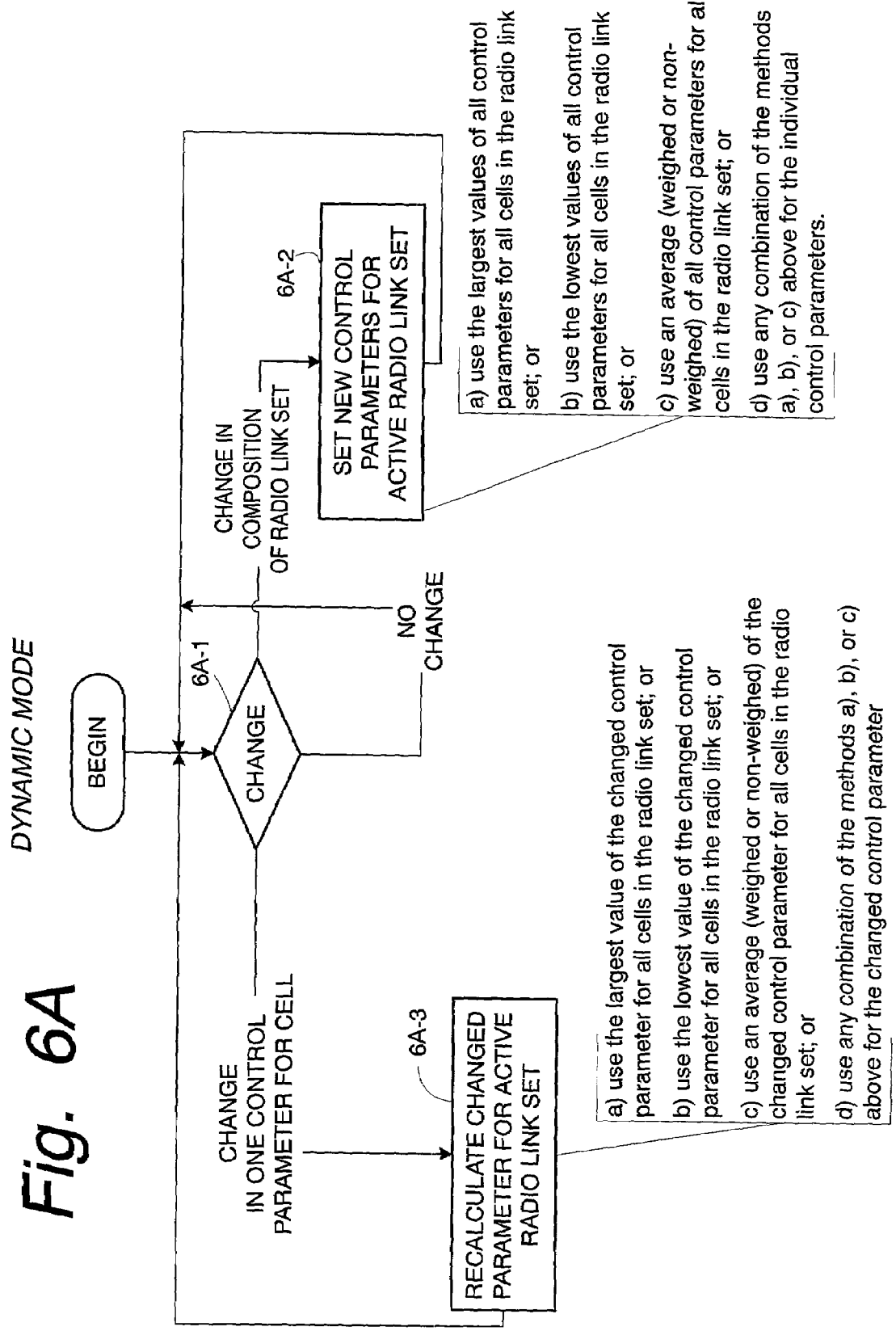

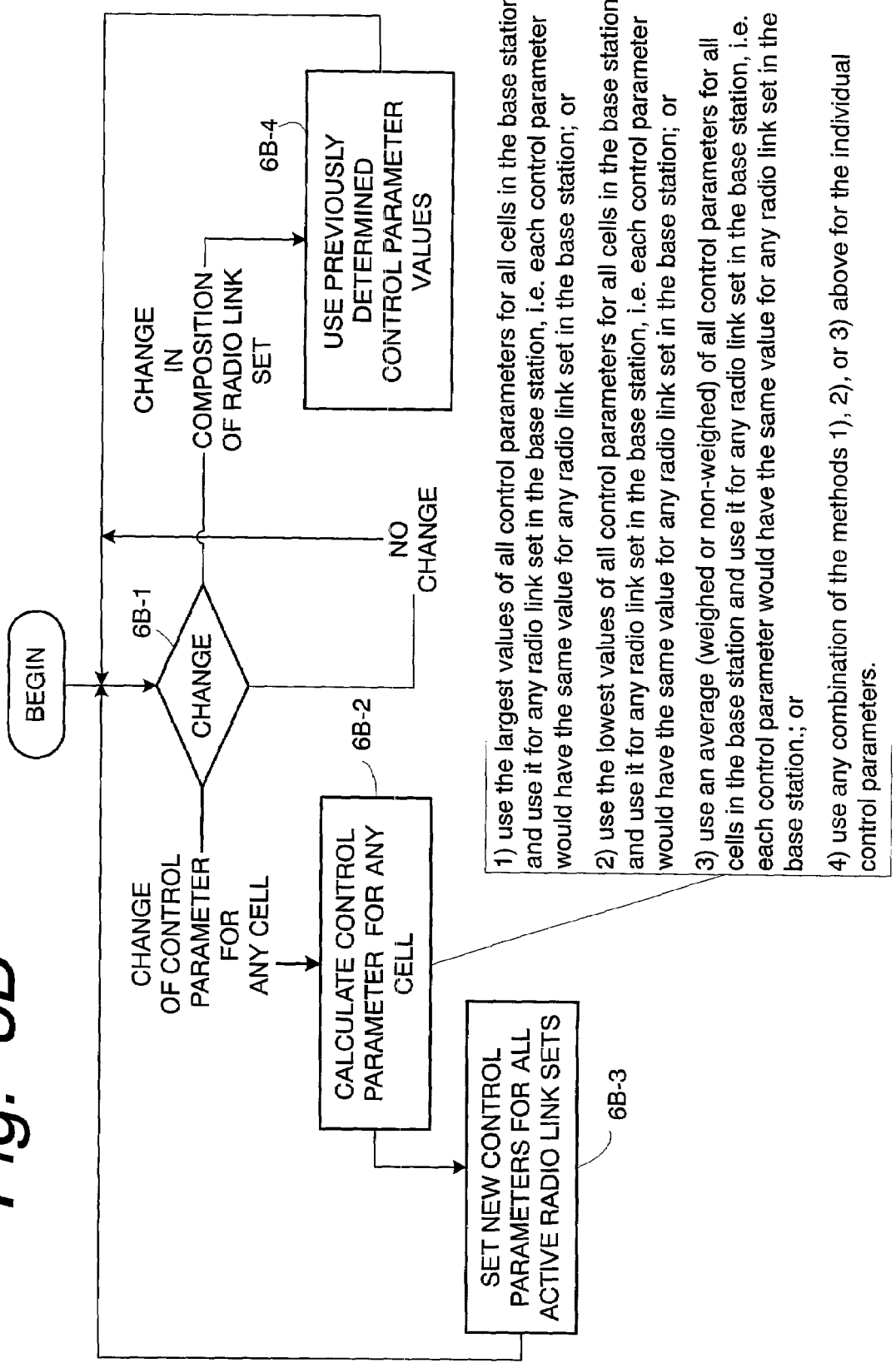
Fig. 6B    FIRST SEMI-STATIC MODE

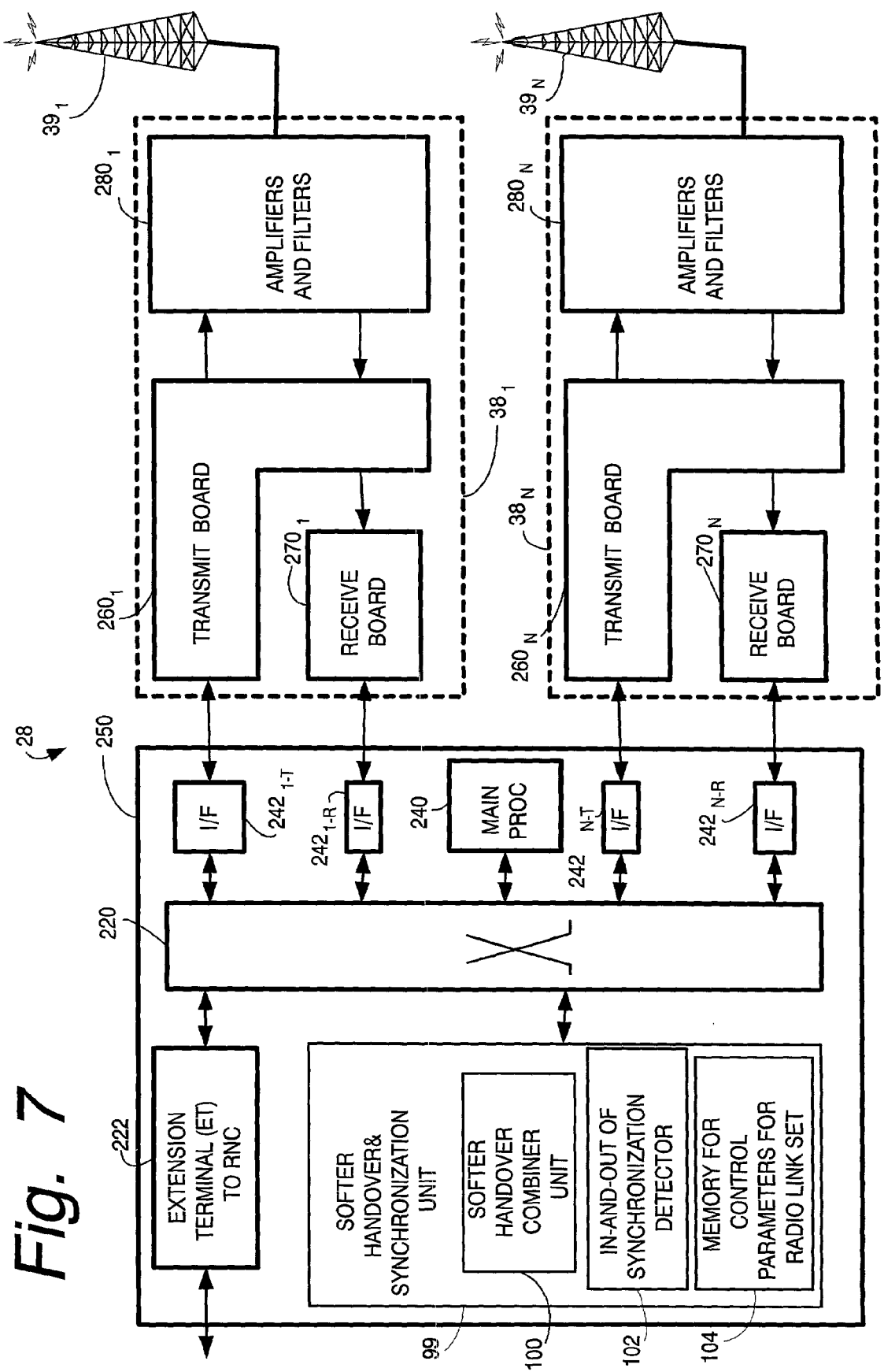

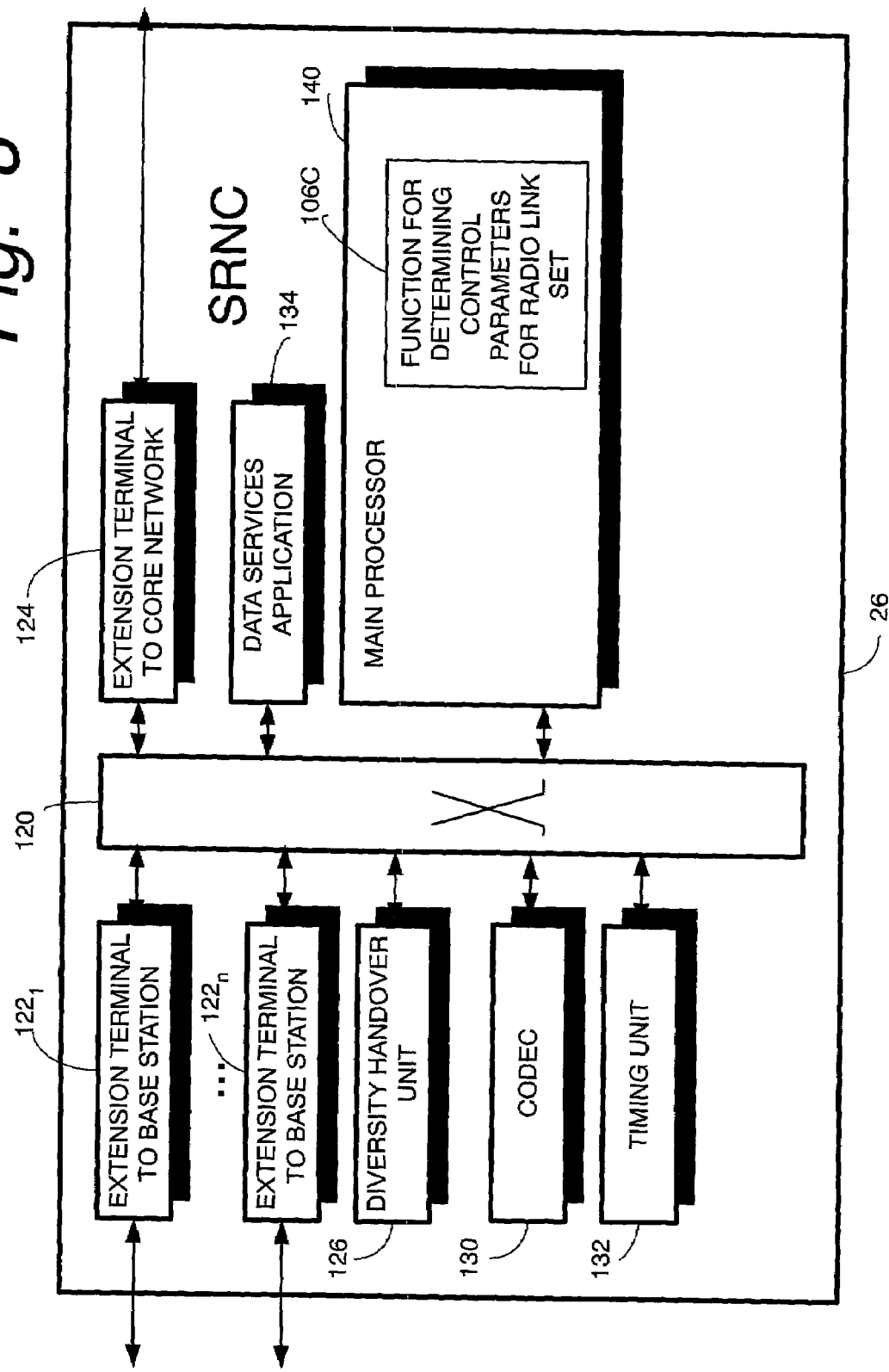

US 7,016,310 B2

DERIVING CONTROL PARAMETERS FOR TELECOMMUNICATIONS IN-AND-OUT-OF-SYNCHRONIZATION DETECTION

This application claims the benefit of Provisional Application Ser. No. 60/194,699 filed Apr. 5, 2000.

BACKGROUND

1. Field of the Invention

The present invention relates to cellular radio communication networks, and particularly to cellular radio communication networks in which the state of a connection with a user equipment unit (UE) is detected by an in-and-out-of-synchronization detection technique.

2. Related Art and other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which is in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks)

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface". In some instances, a connection involves both a Serving or Source RNC (SRNC) and a target or drift RNC (DRNC), with the SRNC controlling the connection but with one or more diversity legs of the connection being handling by the DRNC (see, in this regard, U.S. patent application Ser. No. 09/035,821 filed Mar. 6, 1998, entitled "Telecommunications Inter-Exchange Measurement Transfer"; and U.S. patent application Ser. No. 09/035,788 filed Mar. 6, 1998, entitled "Telecommunications Inter-Exchange Congestion Control", both of which are incorporated herein by reference). The interface between a SRNC and a DRNC is termed the "Iur" interface.

In the current UMTS specifications (see 3GPP TS 25.214 version 3.4.0) there is an algorithm or technique defined for detection of whether or not a connection with a mobile, i.e., user equipment unit (UE), is having reception quality good enough for communication or not. This technique is called in-and-out-of synchronization. The detection of in-and-out-of-synchronization is based on detection for softer combined radio links, defined as the radio links having common generation of power control commands in the downlink (DL), i.e. in the network-to-UE direction. The algorithm is controlled by a number of parameters.

The UL in-and-out-of-sync detection algorithm specified in 3GPP TS 25.214 operates on softer combined radio links (radio link sets). This means that there has to be one set of control parameters for an active radio link set in a base station. The currently agreed approach is to set the parameters on a per cell basis. However, currently there is no method to set uniquely the control parameters for a specific radio link set.

BRIEF SUMMARY OF THE INVENTION

In accordance with the present invention, the control parameters for an in-and-out-of-synchronization detection algorithm/technique for a radio link set (set of combined radio links) are derived from the corresponding cell-based parameters. There are various modes of the method on how the control parameters for the in-and-out-of-synchronization detection algorithm for a radio link set (set of combined radio links) can be derived from the corresponding cell based parameters. For example, it could either be done dynamically, i.e. when a radio link is either added to or removed from a radio link set, or semi-statically, i.e. whenever the control parameters are changed for any cell in a base station, or in a combination of the dynamic and semi-static ways.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 6A is a flowchart view depicting certain basic steps or actions performed in a Dynamic Mode of control parameter determination.

FIG. 6B is a flowchart view depicts certain basic steps or actions performed in a first Semi-static Mode of control parameter determination.

FIG. 7 is a schematic view of an example ATM-based base station node in accordance with one embodiment of the invention.

FIG. 8 is a schematic view of an example RNC node in accordance with one embodiment of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
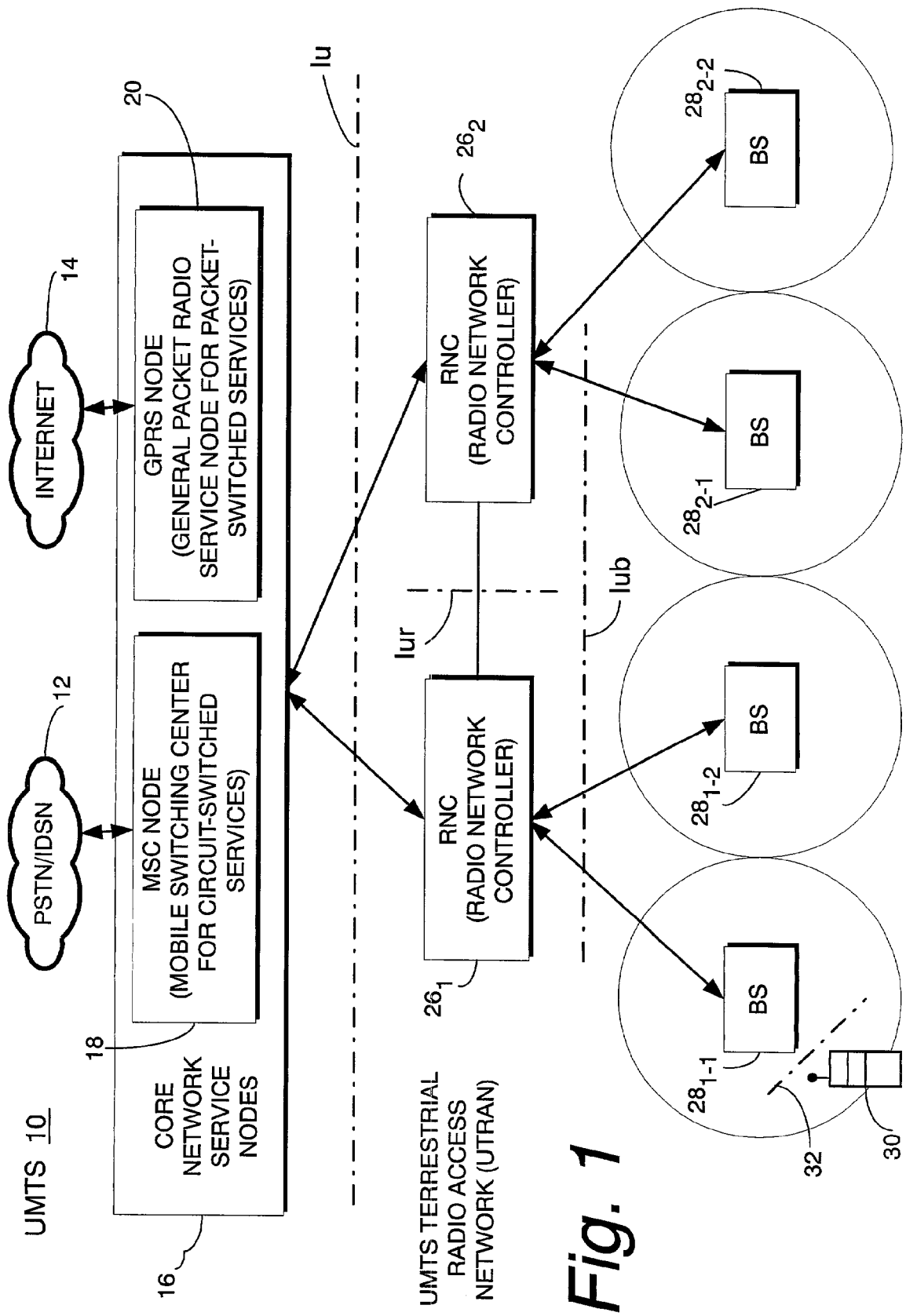
FIG. 1 is a diagrammatic view of an example mobile communications system in which the present invention may be advantageously employed.

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes, particularly RNC $26_1$ and RNC $26_2$. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 1 shows that an RNC can be connected over an Iur interface to one or more other RNCs in the URAN 24.

A user equipment unit (UE), such as user equipment unit (UE) 30 shown in FIG. 1, communicates with one or more base stations (BS) 28 over a radio or air interface 32. Each of the radio interface 32, the Iu interface, the Iub interface, and the Iur interface are shown by dash-dotted lines in FIG. 1.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of control channels may exist between one of the base stations 28 and user equipment units (UEs) 30. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications. Traffic channels (TCH) may be allocated to carry substantive call communications with a user equipment unit (UE).

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for a connection with the user equipment unit (UE).

When a connection between the radio access network (RAN) and user equipment unit (UE) is being established, the radio access network (RAN) decides which RNC is to be the serving RNC (SRNC) and, if needed, which RNC is to be a drift RNC (DRNC). Normally, the RNC that controls the cell where the user equipment unit (UE) is located when the connection is first established is initially selected as the serving RNC (SRNC). As the user equipment unit (UE) moves, the connection is maintained by establishing radio communication branches or legs via new cells, possibly cells controlled by other RNCs. Those other RNCs become drift RNCs (DRNC) for RAN-UE connection.

Figure 2:
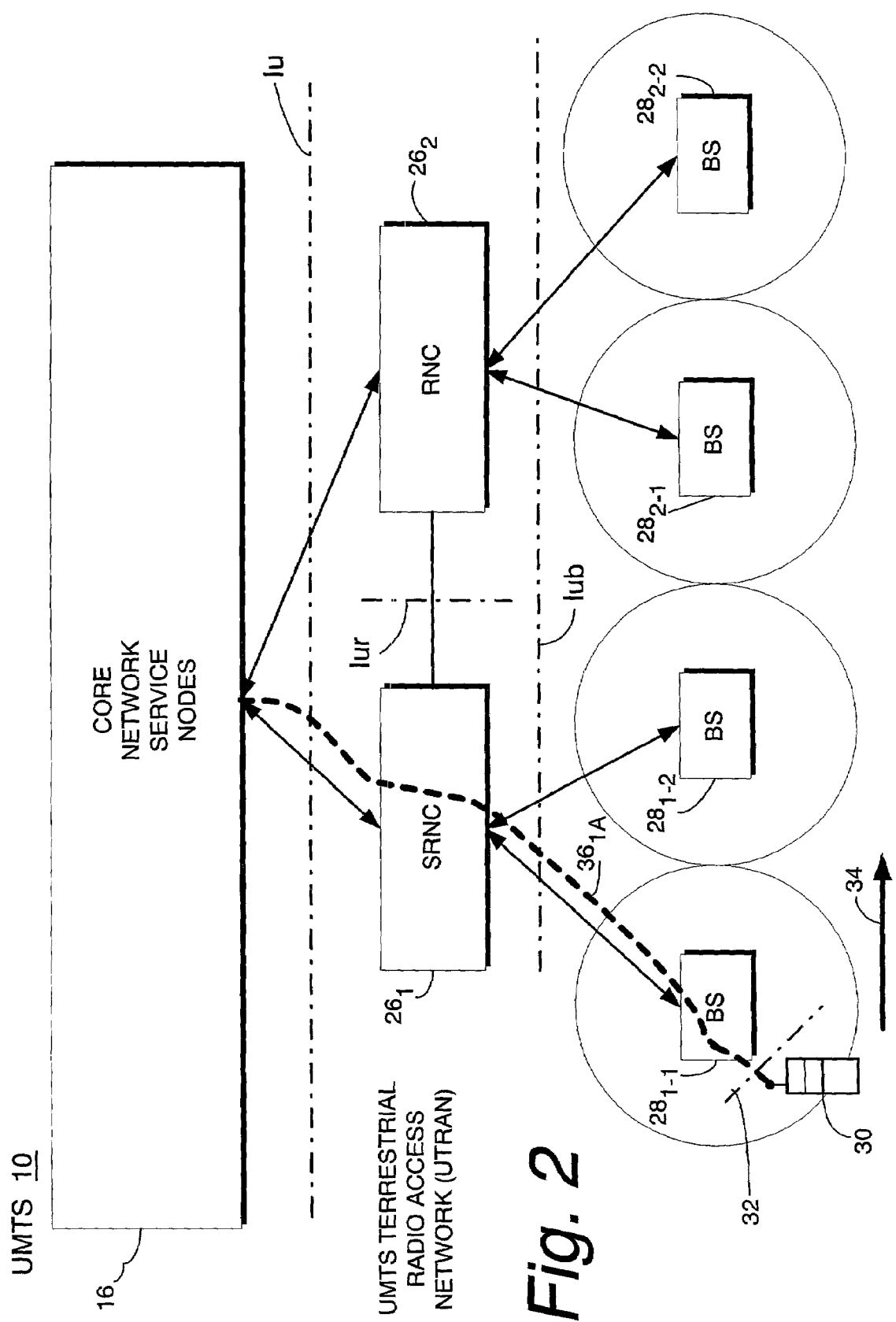
FIG. 2 is a diagrammatic view of an example assignment of RNC roles for the system of FIG. 1 at setup of a connection with a user equipment unit (UE).

To illustrate the foregoing, and as a prelude to an explanation of the present invention, reference is made to the situation shown in FIG. 2. FIG. 2 shows an example of RNC role assignment for user equipment unit (UE) 30 at initial setup of a connection involving user equipment unit (UE) 30. In FIG. 2, radio network controller (RNC) $26_1$ acts as the serving RNC (SRNC) for the connection with user equipment unit (UE) 30, since user equipment unit (UE) 30 is in the cell controlled by base station (BS) $28_{1-1}$. The connection with user equipment unit (UE) 30 in FIG. 2 is shown by the broken line $36_{1A}$ (which extends from core network 16, through radio network controller (RNC) $26_1$, and base station (BS) $28_{1-1}$ to user equipment unit (UE) 30).

Figure 3:
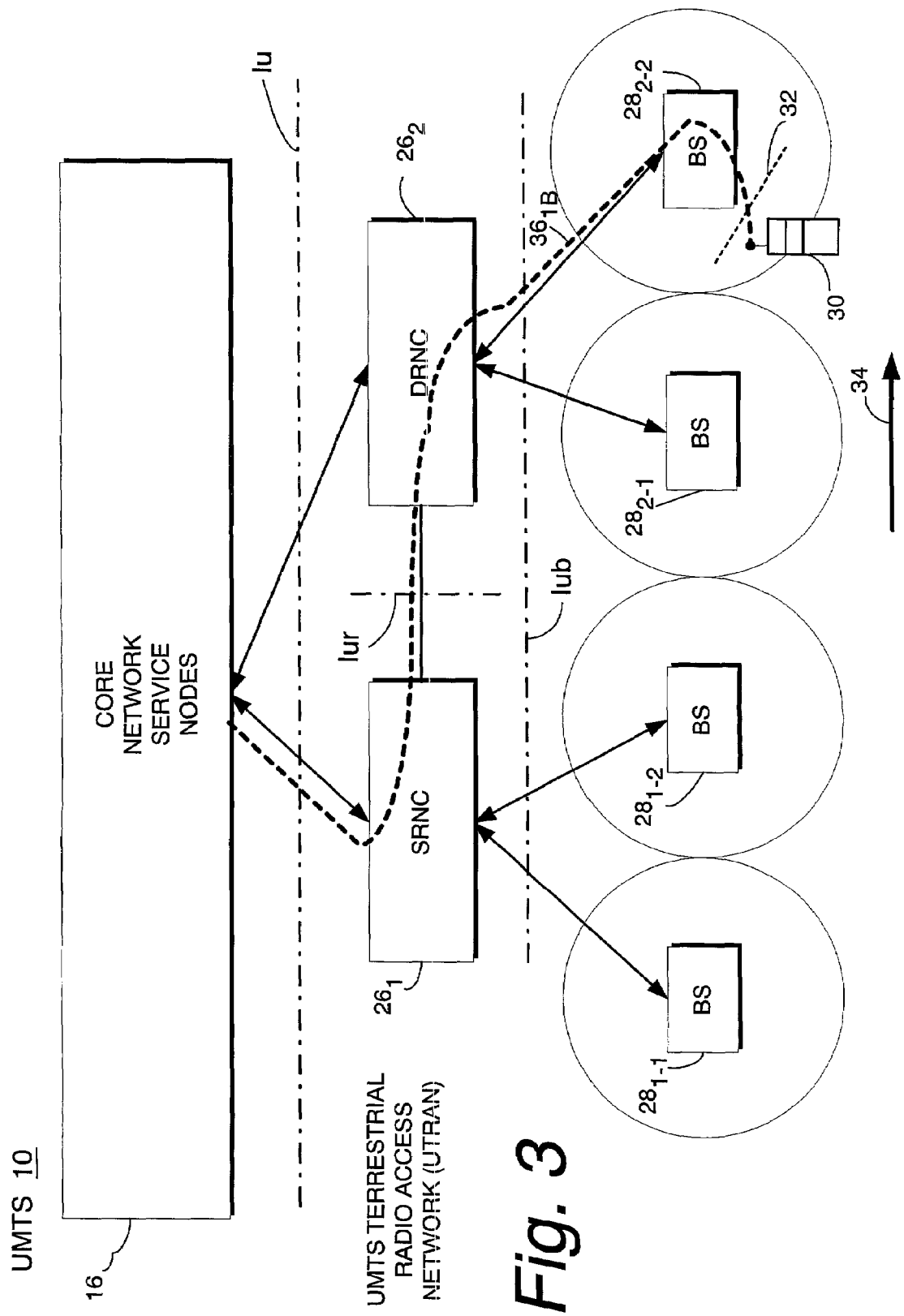
FIG. 3 is a diagrammatic view of an example assignment of RNC roles after successive handovers of the connection with a user equipment unit (UE).

Suppose that user equipment unit (UE) 30 travels in the rightward direction indicated by arrow 34 in FIG. 2, eventually leaving the cell controlled by base station (BS) $28_{1-1}$ and traveling successively through the cells controlled by respective base stations $28_{1-2}$, $28_{2-1}$, and $28_{2-2}$. As user equipment unit (UE) 30 enters a new cell, a handover occurs. The time at which user equipment unit (UE) 30 arrives at the cell controlled by base station $28_{2-2}$ is illustrated in FIG. 3. At such time shown in FIG. 3, radio network controller (RNC) $26_1$ still acts as the serving RNC (SRNC) for the connection to user equipment unit (UE) 30, while radio network controller (RNC) $26_2$ acts as the drift RNC (DRNC). In other words, radio network controller (RNC) $26_1$ still has control of the connection with user equipment unit (UE) 30, while radio network controller (RNC) $26_2$ supplies resources for the connection with respect to the cell in which user equipment unit (UE) 30 currently resides. The connection with user equipment unit (UE) 30 in FIG. 3 is shown by the broken line $36_{1B}$.

In accordance with the present invention, there are two types of combining which can be performed. A first type of combining is soft combining; a second type of combining is softer combining.

Soft combining is selection combining which is performed in a RNC (SRNC or DRNC) or in a base station. The selection combining is based on quality information like BER (Bit Error Rate) or CRC (Cyclic Redundancy Check) for a transport block. A transport block contains one or more bits, and an example is provided in 3GPP specification TS 25.302. For example, in the soft combining a selection is made of a best transport block.

The second type of combining (softer combining), on the other hand, involves macro diversity combining in a base station. The macro diversity combining is based on symbol or chip-related quality information (weighed average of symbols).

A radio link represents a connection between a UE and the radio access network (RAN) in one cell. A radio link set represents a set of radio links being softer combined (maximum ratio combined) in a base station. The current definition of a radio link set is a set of one or more radio links that has a common generation of Transmit Power Control (TPC) commands in the downlink (DL)

Figure 4:
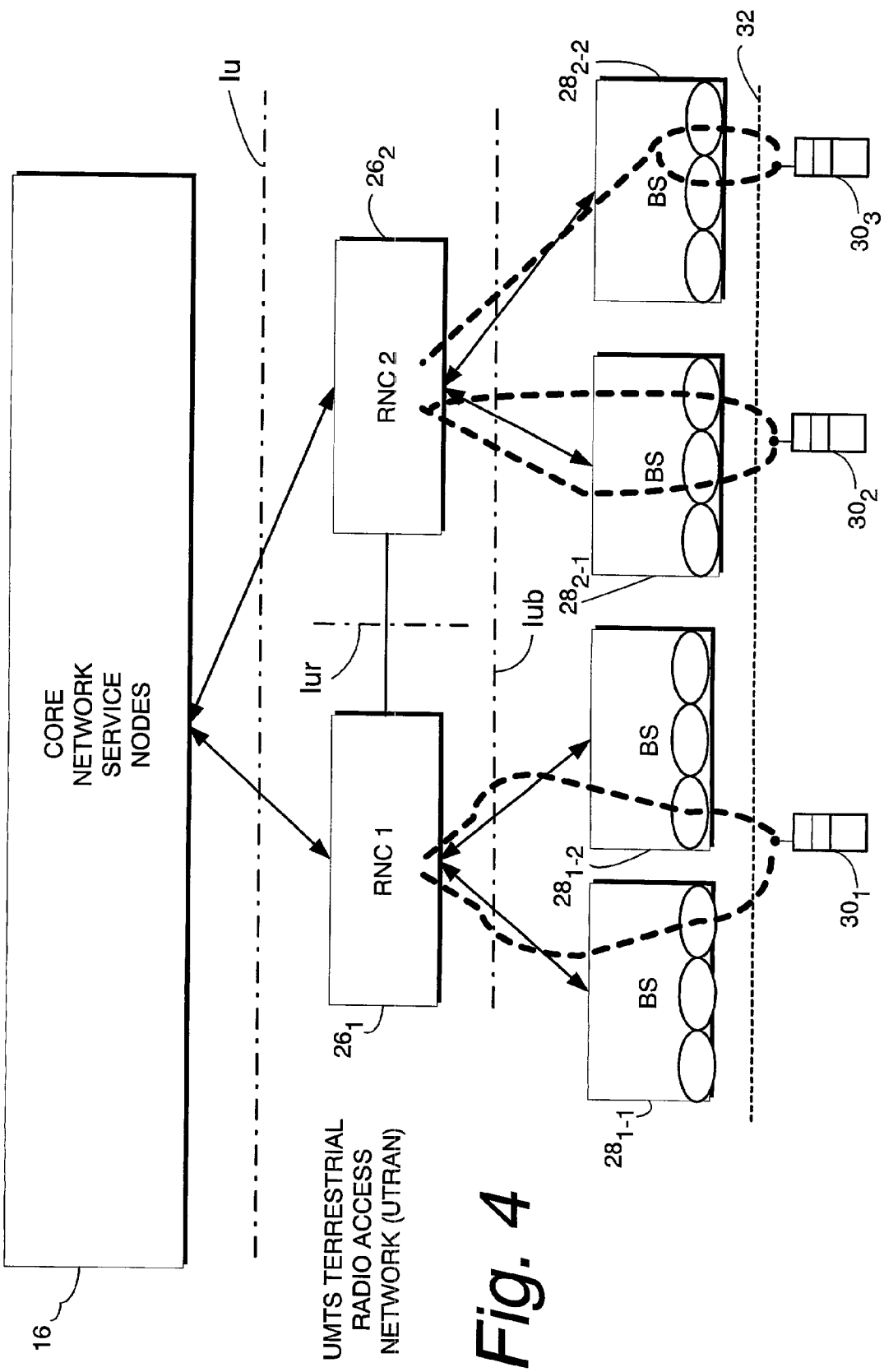
FIG. 4 is a diagrammatic view of example radio links and radio link sets in a radio access network.

FIG. 4 shows all the user equipment units (UEs) as having two radio links, i.e. being connected to the network via two cells. In the case of UE $30_1$ and UE $30_2$ the radio links are provided to the SRNC (RNC $26_1$ for UE $30_1$ and RNC $26_2$ for UE $30_2$) and are thus not combined in the base stations. This means that the UE $30_1$ and UE $30_2$ also have two radio link sets, one per cell. In the case of UE $30_3$ the two radio links are (softer) combined in base station $28_{2-2}$, and these two radio links thus belong to the same radio link set.

Figure 5A:
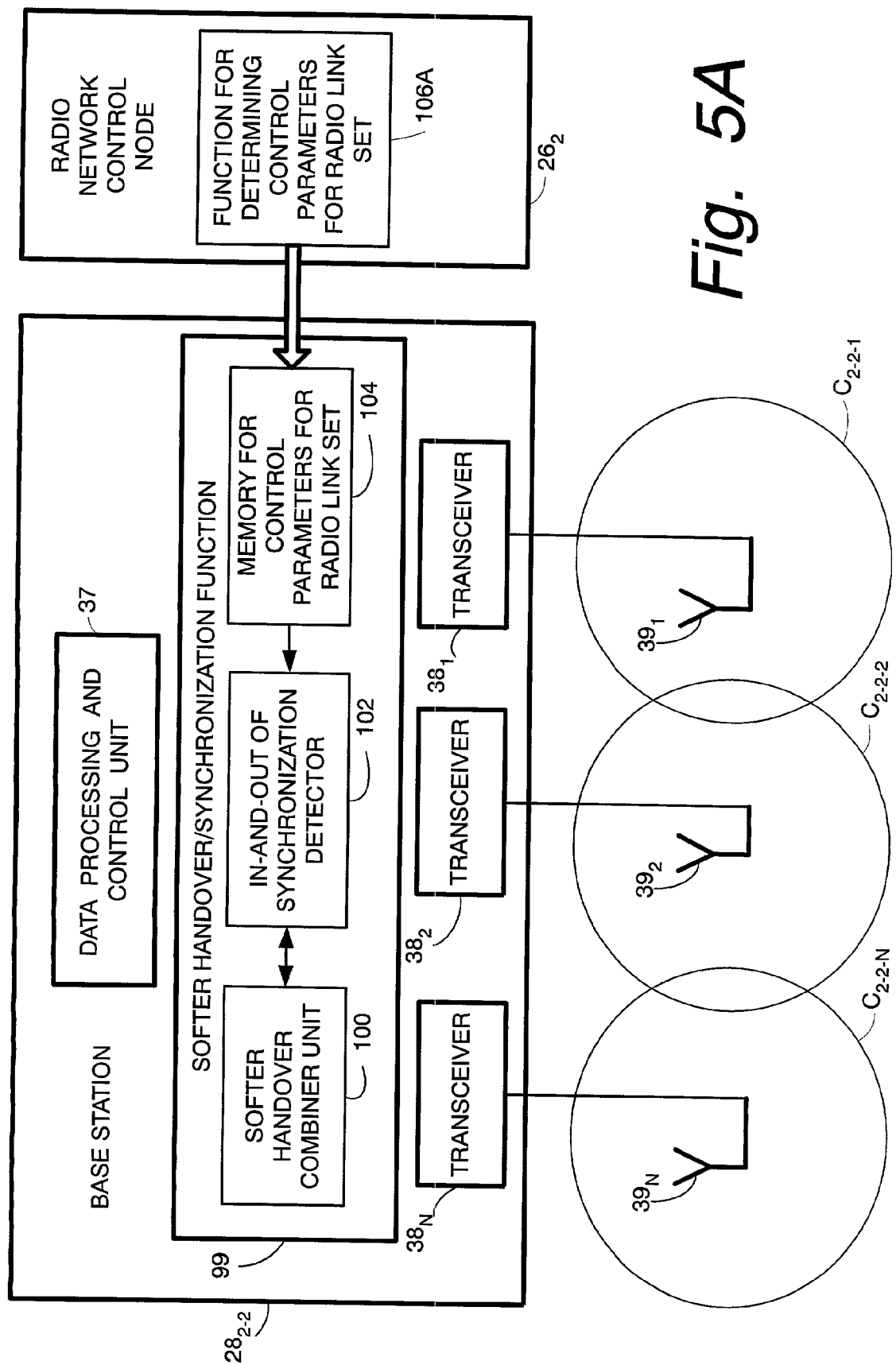
FIG. 5A is a diagrammatic view of portions of an example base station node in accordance with a first example embodiment of the invention.

FIG. 5A shows by way of representative example that the base station $28_{2-2}$ has a data processing and control unit 37. Part of the equipment controlled by the base station data processing and control unit 37 includes plural radio transceivers 38 connected to one or more antennas 39. For example, radio transceiver $38_1$ and antenna $39_1$ are associated with cell $C_{2-2-1}$ served by base station $28_{2-2}$; radio transceiver $38_2$ and antenna $39_2$ are associated with cell $C_{2-2-2}$ served by base station $28_{2-2}$; and so on up to cell the $C_{2-2-N}$.

FIG. 5A also shows that, in accordance with the present invention, the base station $28_{2-2}$ includes a softer handover and synchronization detection function 99. Included in softer handover and synchronization function 99 is a softer handover combiner unit 100 which performs macro diversity combining at base station $28_{2-2}$ for the radio link sets extant at base station $28_{2-2}$. An in-and-out of synchronization detector 102 works in conjunction with softer handover combiner unit 100 for detecting or determining whether or not a connection with a mobile, i.e., user equipment unit (UE), is having reception quality good enough for communication or not. The in-and-out of synchronization detector 102 is an algorithm or technique which operates in accordance with the current UMTS specifications (see 3GPP TS 25.214 version 3.4.0). This technique is called in-and-out-of synchronization. The detection of in-and-out-of-synchronization is based on detection for softer combined radio links, defined as the radio links having common generation of power control commands in the downlink (DL), i.e. in the network-to-UE direction. The algorithm is controlled by a number of parameters.

The uplink (UL) in-and-out-of-sync detection algorithm specified in 3GPP TS 25.214 operates on softer combined radio links (radio link sets). This means that there has to be one set of control parameters for an active radio link set in a base station. The currently agreed approach is to set the parameters on a per cell basis. However, currently there is no method to set uniquely the control parameters for a specific radio link set.

In accordance with the present invention, the control parameters for the in-and-out-of-synchronization detection algorithm are determined and set uniquely for a radio link set (set of combined radio links). The control parameters for a radio link set are derived from the corresponding cell-based parameters. FIG. 5A shows a control parameter memory 104 which is included in softer handover and synchronization function 99 and which stores control parameters which are determined in accordance with principles and techniques of the present invention, and which supplies the control parameters so determined to in-and-out of synchronization detector 102.

Figure 5B:
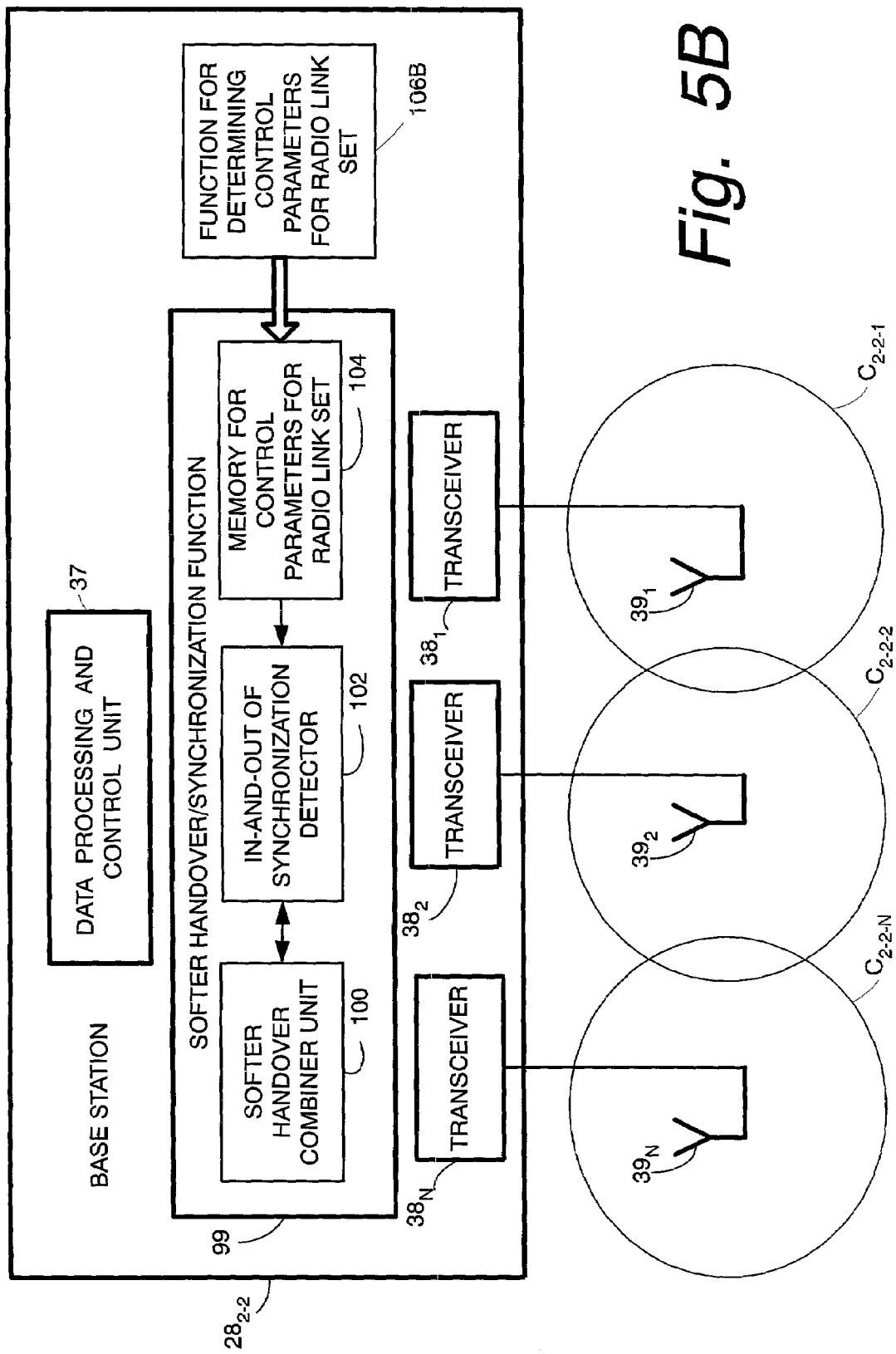
FIG. 5B is a diagrammatic view of portions of an example base station node in accordance with a second example embodiment of the invention.
Figure 5C:
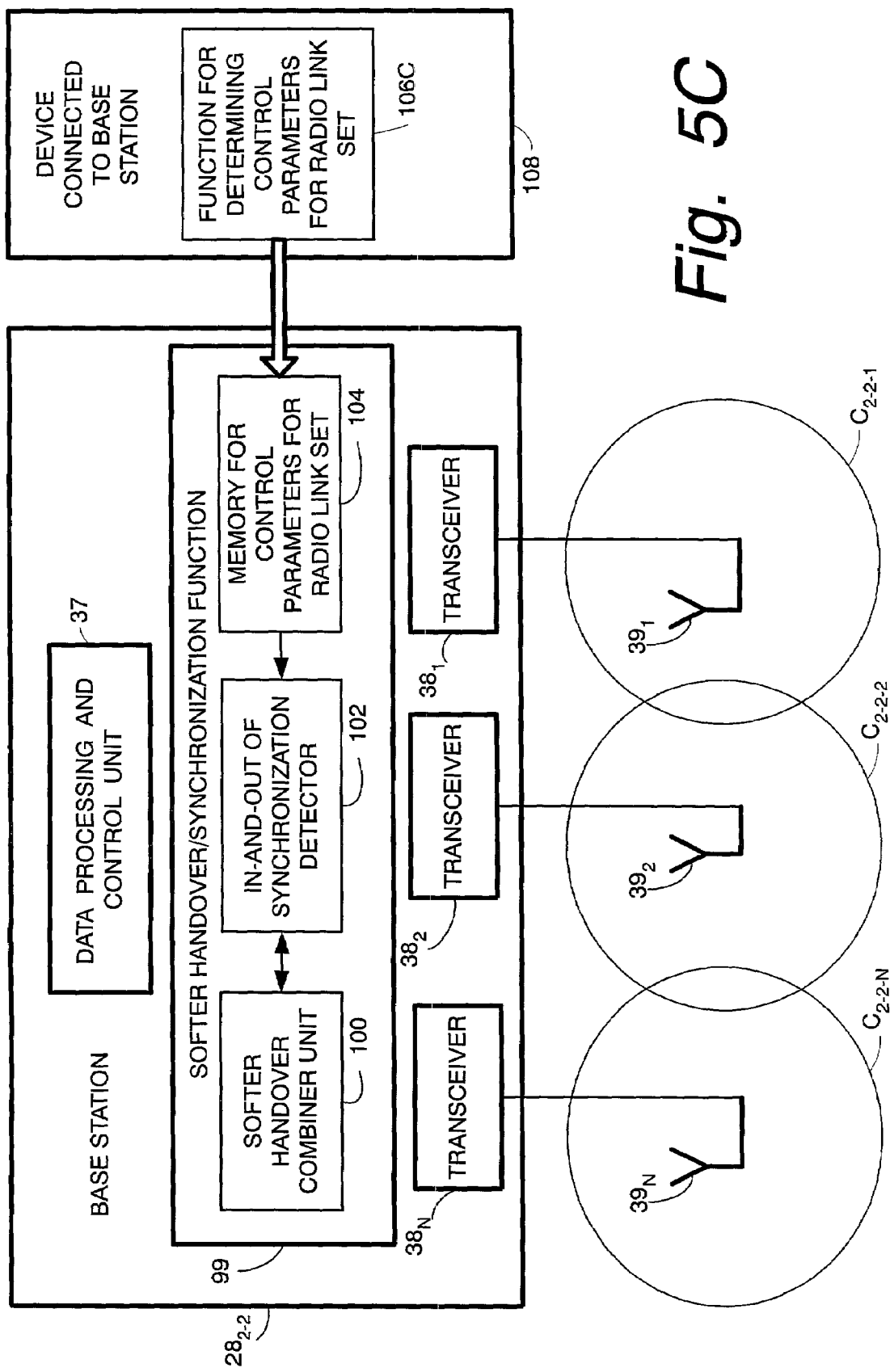
FIG. 5C is a diagrammatic view of portions of an example base station node in accordance with a third example embodiment of the invention.

In differing embodiments of the present invention, a function 106 for determining or setting the control parameters for the radio link set can be implemented in differing ways. For the embodiment of FIG. 5A, a function 106A for determining control parameters for the radio link set is situated in the radio network control (RNC) node $26_2$. For the embodiment of FIG. 5B, a function 106B for determining control parameters for the radio link set enables configuring of the control parameters in the base station itself, e.g., using either a locally or remotely situated maintenance terminal connected to the base station. In this regard, the function 106B for determining control parameters for the radio link set of FIG. 5B can be conceptualized as being included as part of data processing and control unit 37. For the embodiment of FIG. 5C, a function 106C for determining control parameters for the radio link set is situated, at least in part, in another device 108 connected to the base station. All variants of the function 106 for determining control parameters for the radio link set are herein encompassed by reference to function 106, it being understood that the foregoing implementations are only illustrative examples.

Figure 9:
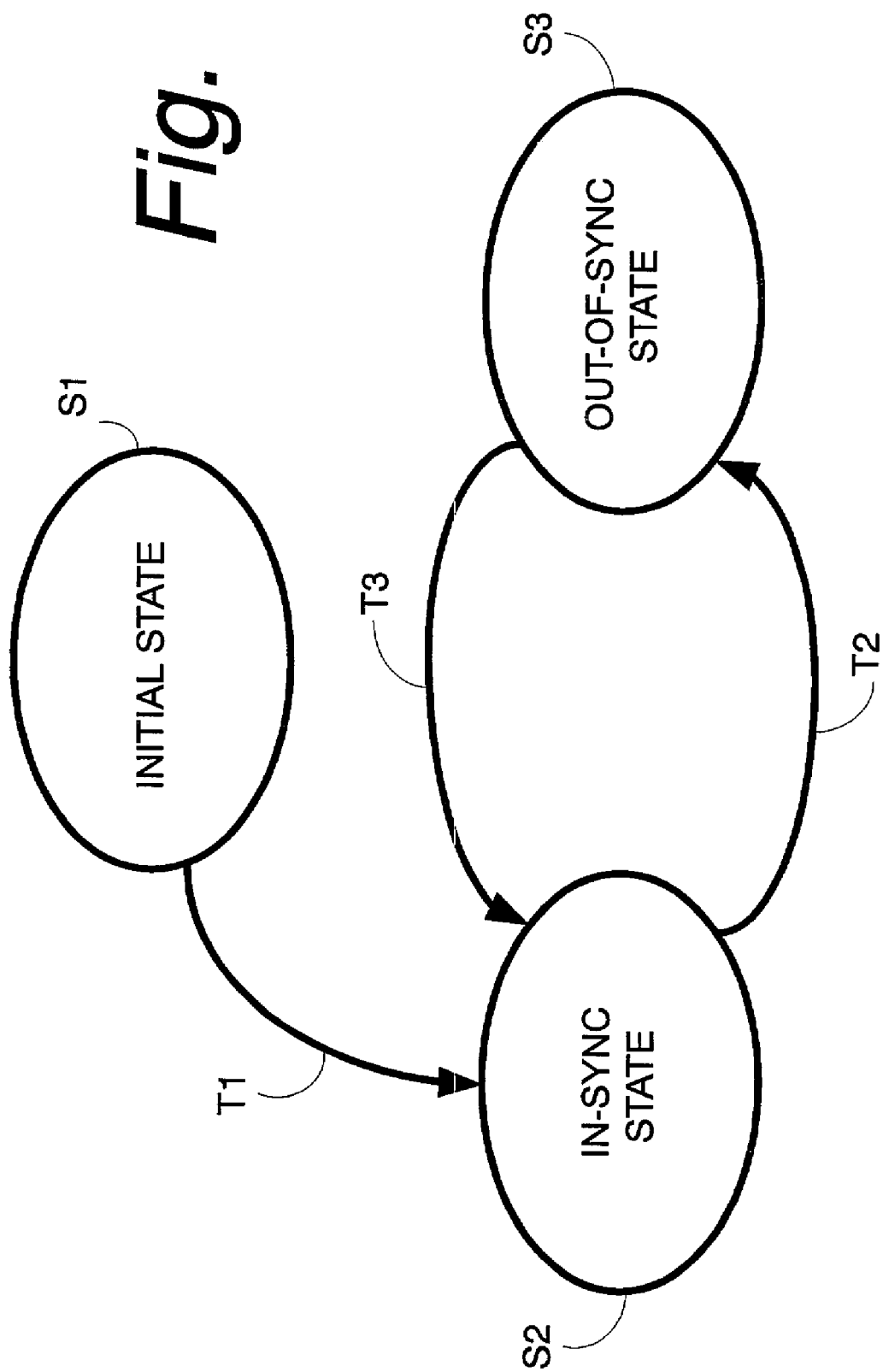
FIG. 9 is a state diagram showing various states and state transitions involved in an in-and-out of synchronization detection algorithm utilized by the present invention.

The parameters which are stored in control parameter memory 104 and determined or derived by function 106 are the parameters which are used to control the in-and-out of synchronization detector 102. Examples of these control parameters, based on the current 3G TS 25.214, are shown in Table 1. FIG. 9 shows basic states and state transitions involved into an in-and-out of synchronization algorithm performed by in-and-out of synchronization detector 102 according to 3G TS 25.214.

The basic states included in the in-and-out of synchronization algorithm performed by in-and-out of synchronization detector 102 shown in FIG. 9 are the initial state S1, the in-sync state S2, and the out-of-sync state S3. The state transitions depicted in FIG. 9 are the transition T1 from initial state S1 to in-sync state S2; the transition T2 from in-sync state S2 to out-of-sync state S3; and, the transition T3 from out-of-sync state S3 to in-sync state S2.

Regarding the state transitions of the in-and-out of synchronization detection algorithm depicted basically by FIG. 9, when N_INSYNC_IND consecutive in-sync indications have been received, the state of the Radio Link Set is changed to in-sync (i.e., the transition T1 from initial state S1 to in-sync state S2 occurs). When N_OUTSYNC_IND consecutive out-of-sync indications have been received a timer is started (T_RLFAILURE). When the timer expires the state of the Radio Link Set is changed to out-of-sync (i.e., transition T2 from in-sync state S2 to out-of-sync state S3 occurs). If N_INSYNC_IND consecutive in-sync indications are received while the timer is running the timer is reset and the state of the Radio Link Set remains in-sync. After being in out-of-sync state S3, when N_INSYNC_IND consecutive in-sync indications have been received the state of the Radio Link Set is changed to in-sync (i.e., the transition T3 from out-of-sync state S3 to in-sync state S2 occurs).

TABLE 1

CONTROL PARAMETERS
FOR IN-AND-OUT OF SYNCHRONIZATION DETECTION

| Control Parameter | Description |
| --- | --- |
| N_INSYNC_IND | The number of consecutive in-sync indications that have to be received until a Radio Link Set is considered as being in-sync (Applicable in the initial state and the out-of-sync state as well as during the "waiting time") |
| N_OUTSYNC_IND | The number of consecutive out-of-sync indications that have to be received before initiating a "waiting time" after which the Radio Link Set may be considered as out-of-sync (Applicable in the in-sync state.) |
| T_RLFAILURE | The time to wait after receiving N_OUTSYNC_IND consecutive out-of-sync indications before a Radio Link Set is considered as out-of-sync (Applicable in the in-sync state). |

The present invention also provides various modes of the method on how the control parameters for the in-and-out-of-synchronization detection algorithm for a radio link set (set of combined radio links) can be derived or determined by function 106 for determining control parameters for the radio link set from the corresponding cell based parameters. For example, control parameter determination can either be done dynamically, e.g., when a radio link is either added to or removed from a radio link set, or semi-statically, e.g., whenever the control parameters are changed for any cell in a base station, or in a combination of the dynamic and semi-static ways.

Dynamic Mode of Determining Control Parameters

In a Dynamic Mode of the invention, the control parameters for in-and out-of-sync detection are calculated/re-calculated (by the function 106 for determining or setting the control parameters for the radio link set):

every time a Radio Link is added to a Radio Link Set, every time a Radio Link is removed from a Radio Link Set, and every time any of the control parameters for a cell supporting any of the Radio Links in the Radio Link Set is changed.

The calculation in the Dynamic Mode will result in Table 2 being valid for the Radio Link Set (one row per control parameter). When one control parameter changes for a cell it is sufficient to re-calculate the row of Table 2 corresponding to that parameter rather than the complete table. If a Radio Link is added to or removed from the Radio Link Set the complete table is to be re-calculated.

TABLE 2

| Parameter Name | Parameter value |
| --- | --- |
| Control Parameter 1 | |
| Control Parameter 2 | |
| Control Parameter 3 | |
| . | |
| . | |
| . | |
| Control Parameter N | |

FIG. 6A diagrammatically depicts certain basic steps or actions associated with control parameter determination function 106 for the Dynamic Mode. As action 6A-1, the function 106 for determining or setting the control parameters for the radio link set ascertains (e.g., determines or is apprised) whether a change has occurred, e.g., whether there is a change in the composition of a particular radio link set being handled by softer handover combiner unit 100 or whether one of the control parameters for a cell has changed. If a radio link is added or removed from the radio link set, as action 6A-2 the function 106 determines the new control parameters for the active radio link set. The new control parameters for the active radio link set can be determined in accordance with any one of the techniques a) through d) listed in Table 3. If, on the other hand, it is determined as action 6A-1 that one of the control parameters for a cell has changed, as action 6A-3 the function 106 preferably recalculates only the changed parameter for the active radio link set in accordance with Table 4.

TABLE 3

DYNAMIC MODE TECHNIQUES
CHANGE OF COMPOSITION OF RADIO LINK SET

| Technique | Description |
|---|---|
| a) | use the largest values of all control parameters for all cells in the radio link set |
| b) | use the lowest values of all control parameters for all cells in the radio link set |
| c) | use an average (weighed or non-weighed) of all control parameters for all cells in the radio link set |
| d) | use any combination of the methods a), b), or c) above for the individual control parameters |

TABLE 4

DYNAMIC MODE TECHNIQUES
CHANGE OF CONTROL PARAMETER

| Technique | Description |
|---|---|
| a) | use the largest values of the changed control parameter for all cells in the radio link set |
| b) | use the lowest values of the changed control parameter for all cells in the radio link set |
| c) | use an average (weighed or non-weighed) of the changed control parameter for all cells in the radio link set |
| d) | use any combination of the methods a), b), or c) above for the changed control parameter |

Thus, for the Dynamic Mode, the control parameters for an active radio link set are derived by the function 106 for determining or setting the control parameters for the radio link set in accordance with any of the ways/techniques a) through d) [listed in Table 3 and Table 4] or from the corresponding control parameters defined per cell.

First Semi-static Mode of Determining Control Parameters

In a first Semi-static Mode, the control parameters for an active radio link set are determined or derived in a way common to all potential radio link sets in a base station. Moreover, in the first Semi-static Mode, when there is establishment of a radio link set or any change in composition in a radio link set, the control parameters which have been previously derived or calculated by function 106 are still utilized for the changed radio link set. Thus, in the first Semi-static Mode, the control parameters are not affected by any change in composition in a radio link set.

FIG. 6B diagrammatically depicts certain basic steps or actions performed by function 106 for determining or setting the control parameters for the radio link set for the first Semi-static Mode. As action 6B-1, function 106 ascertains (e.g., determines or is apprised) whether a change has occurred, e.g., whether there is a change in the composition of a particular radio link set being handled by softer handover combiner unit 100 or whether one of the control parameters for a cell has changed. If it is determined as action 6B-1 that one of the control parameters for a cell has changed, as action 6B-2 the function 106 calculates control parameters for the radio link sets. The new control parameters for the radio link sets can be determined in accordance with any one of 1) through 4) listed in Table 5. Thereafter, as step 6B-3, the function 106 sets the new control parameters for all active radio link sets.

If, on the other hand, it is determined as action 6B-1 that a radio link set is established or a radio link is added or removed from the radio link set, as action 6B-4 the function 106 uses the previously calculated control parameter values for the new or changed-composition radio link set. Using the previously calculated control parameter values essentially involves using the control parameter values calculated during the last execution of action 6B-2.

TABLE 5

1st SEMI-STATIC MODE TECHNIQUES
CHANGE OF CONTROL PARAMETER

| Technique | Description |
|---|---|
| 1) | Use the largest values of all control parameters for all cells in the base station and use it for any radio link set in the base station, i.e. each control parameter would have the same value for any radio link set in the base station. |
| 2) | Use the lowest values of all control parameters for all cells in the base station and use it for any radio link set in the base station, i.e. each control parameter would have the same value for any radio link set in the base station. |
| 3) | Use an average (weighed or non-weighed) of all control parameters for all cells in the base station and use it for any radio link set in the base station, i.e. each control parameter would have the same value for any radio link set in the base station. |
| 4) | Use any combination of the methods 1), 2), or 3) above for the individual control parameters. |

The above techniques could be applied by e.g. re-calculating the control parameters according to the above-described methods if the value of a control parameter changes for any of the cells in the base station.

Thus, the control parameters for in-and out-of-sync detection for the first Semi-Static Mode are calculated/re-calculated every time any of the control parameters for a cell in the base station is changed. Since any radio link set in the base station uses the same control parameters for in-and out-of-sync detection there will be one set of control parameters available in the base station. The calculation will result in a Table similar to Table 2 above for any Radio Link Set in the base station (one row per control parameter). When one control parameter changes for a cell it is enough to re-calculate the row corresponding to that parameter rather than the complete table.

Second Semi-static Mode of Determining Control Parameters

In a second Semi-Static Mode, the control parameters for in-and out-of-sync detection are calculated/re-calculated every time any of the control parameters for a cell in the base station is changed. The calculation is performed by function 106 for every potential radio link set in the BS, i.e. for every combination of cells that could support a radio link set. As used herein, a "potential radio link set" is a general term for any combination of one or more cells in the base station that could support a radio link set. Assuming a base station with 3 cells (e.g., cell A, cell B, and cell C) then for each control parameter the calculation performed by function 106 yields a table similar to Table 6. As in the other modes, when one control parameter changes for a cell it is enough to re-calculate the table corresponding to that parameter rather than all the tables.

TABLE 6

| Control Parameter X Radio Link Set supported by cells | Parameter value |
|---|---|
| A | |
| B | |
| C | |
| A + B | |
| A + C | |
| B + C | |
| A + B + C | |

Figure 6C:
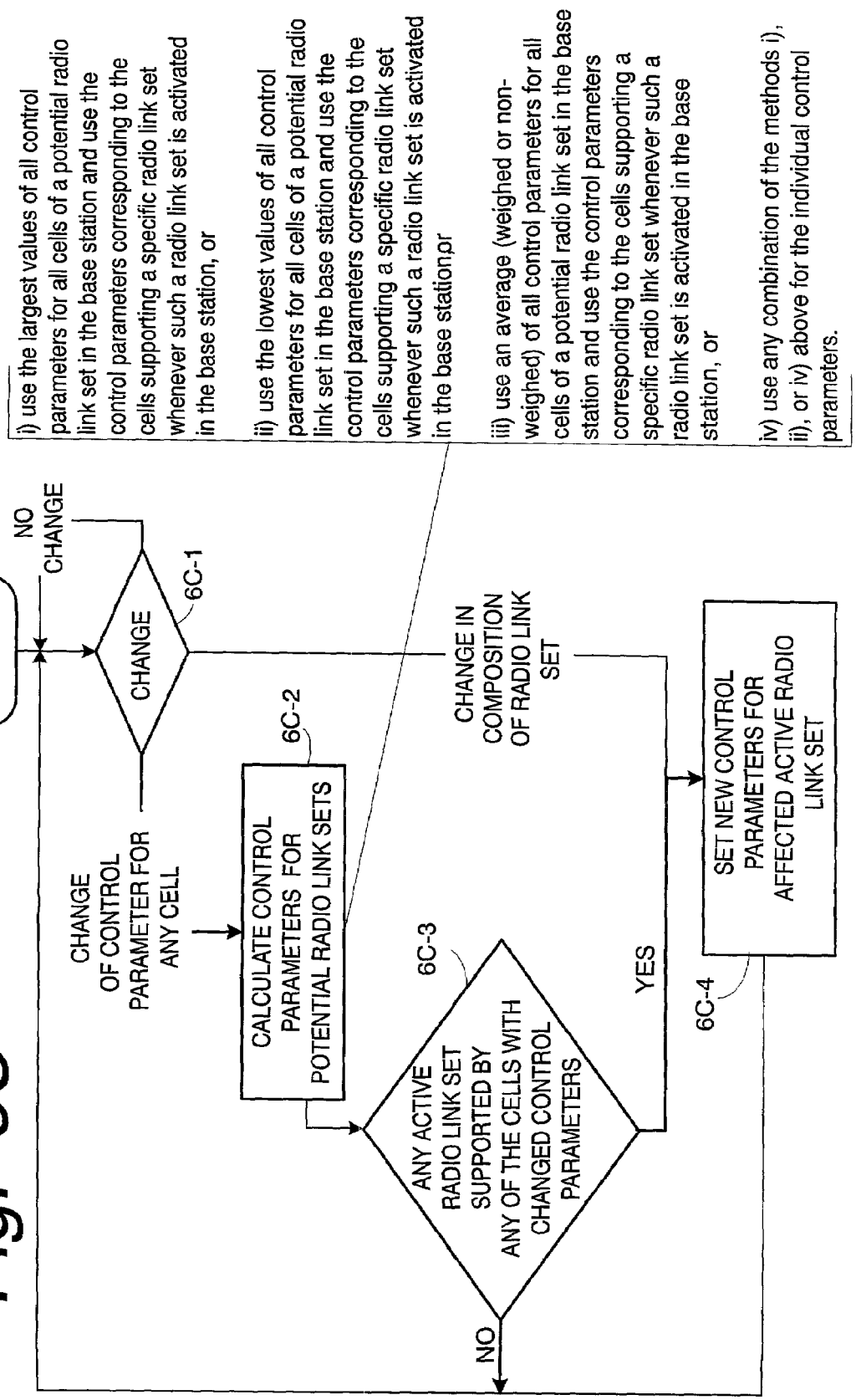
FIG. 6C is a flowchart view depicts certain basic steps or actions performed in a second Semi-static Mode of control parameter determination.

FIG. 6C diagrammatically depicts certain basic steps or actions associated with function 106 for the second Semi-static Mode. As action 6C-1, control parameter function 106 ascertains (e.g., determines or is apprised) whether a change has occurred, e.g., whether there is a change in the composition of a particular radio link set being handled by softer handover combiner unit 100 or whether one of the control parameters for a cell has changed. If it is determined as action 6C-1 that one of the control parameters for a cell has changed, as action 6C-2 the function 106 determines (e.g., calculates) the control parameters for the potential radio link sets. The new control parameters for the potential radio link sets can be determined in accordance with any one of i) through iv) listed in Table 7.

TABLE 7

2nd SEMI-STATIC MODE TECHNIQUES
CHANGE OF CONTROL PARAMETER

| Technique | Description |
|---|---|
| i) | Use the largest values of all control parameters for all cells of a potential radio link set in the base station and use the control parameters corresponding to the cells supporting a specific radio link set whenever such a radio link set is activated in the base station. |
| ii) | Use the lowest values of all control parameters for all cells of a potential radio link set in the base station and use the control parameters corresponding to the cells supporting a specific radio link set whenever such a radio link set is activated in the base station. |
| iii) | Use an average (weighed or non-weighed) of all control parameters for all cells of a potential radio link set in the base station and use the control parameters corresponding to the cells supporting a specific radio link set whenever such a radio link set is activated in the base station. |
| iv) | Use any combination of the methods i), ii), or iv) above for the individual control parameters. |

As action 6C-3, function 106 determines whether any active radio link set is supported by any of the cells with changed control parameters. If the determination of action 6C-3 is negative, there is essentially no change. But if the determination of action 6C-3 is positive, as action 6C-4 the function 106 sets the new control parameters for the affected active radio link set.

Similarly, if it is determined as action 6C-1 that a radio link set is established or a radio link is added or removed from the radio link set, action 6C-4 is performed. The function 106 uses the previously calculated control parameter values stored in Table 6 for the new or changed-composition radio link set. However, which particular value from Table 6 is utilized depends on which cells support the radio link set. In other words, for each control parameter a new row in the Table 6 for that parameter is selected, the row selection being dependent upon which cells support the radio link set. Thus, in both the Dynamic Mode and the second Semi-Static Mode the control parameters to be employed for an active radio link set are dependent on radio link set composition.

The above methods could be applied by e.g. re-calculating the control parameters according to the above-described methods if the value of a control parameter changes for any of the cells in the base station.

Combined Mode of Determining Control Parameters

In a Combined Mode, any combination of the methods a), b), c), 1), 2), 3), i), ii), and iii) above can be used for determining the control parameters, such as the control parameter described in 3GPP TS 25.214. For example, the control parameter N_OUTSYNC_IND could be derived or determined by function 106 using the Dynamic Mode, whereas the other control parameters could be derived or determined using the first Semi-Static Mode. In making such combinations, however, it should be observed that there is a close relationship between the parameters N_INSYNC_IND and T_RLFAILURE such that it must be possible to received N_INSYNC_IND consecutive in-synchronization indications within the time T_RLFAILURE, otherwise the timer R_RLFAILURE could be zero. Preferably (but not necessarily) the parameters N_INSYNC_IND and T_RLFAILURE should be set by the same mode of the invention.

FIG. 7 illustrates, in non-limiting manner, more details of an example base station (BS) node 28 in accordance with one representative, non-limiting embodiment of the present invention. In the embodiment of FIG. 7, the base station (BS) node 28 is a switched-based node having a switch 220 which serves to interconnect other constituent elements of base station (BS) node 28. Such other constituent elements include extension terminal (ET) 222; BS main processor 240, and interface boards 242. Extension terminal (ET) 222 connects base station (BS) node 28 to radio network controller (RNC) node 26, and thus comprises the Iub interface. In at least some embodiments, the extension terminal (ET) 222 can include functionality, which multiplexes and demultiplexes and (optionally) queues with regard to differing protocols of cells.

In addition, the base station hosts the softer handover and synchronization function 99. As mentioned above, the softer handover and synchronization function 99 includes softer handover combiner unit 100, in-and-out of synchronization detector 102, and control parameter memory 104. The softer handover and synchronization function 99 can be included as a separate unit (as shown in FIG. 7 as being connected to switch core 120). Alternatively, softer handover and synchronization function 99 can be included in another suitable unit or board which comprises the base station. For example, in other implementations, it is also possible for one or more of the elements of softer handover and synchronization function 99 to be included elsewhere in base station 28, e.g., in the data processing and control unit 37, e.g., in main processor 240. It should be realized, however, that one or more of these functions could, in other embodiments, be implemented in other ways such as using individual hardware circuits, using software functioning in conjunction with a suitably programmed digital microprocessor or general purpose computer, using an application specific integrated circuit (ASIC), and/or using one or more digital signal processors (DSPs).

The embodiment of base station (BS) node 28 illustrated in FIG. 7 is housed in a rack having multiple subracks. Each subrack has one or more boards, e.g., circuit boards, mounted thereon. A first subrack 250 contains boards for each of extension terminal 222; BS main processor 240, and interface boards 242. Each of the interface boards 242 is connected to a board on another subrack, e.g., one of the transmitter boards 260 or one of the receiver boards 270. Each receiver board 270 is connected to share certain transmitter/receiver resources in a corresponding transmitter board 260, with the transmitter board 260 being connected to a corresponding one of amplifiers and filters board 280. The amplifiers and filters board 280 is connected to an appropriate antenna 39. For example, interface board $242_{1-T}$ is connected to transmitter board $260_1$, while interface board $242_{1-R}$ is connected to receiver board $270_1$. The pair of transmitter board $260_1$ and receiver board $270_1$ is, in turn, connected to amplifiers and filters board $280_1$. Similar connections exist for a second pairing of transmitter board $260_2$ and receiver board $270_2$, which interface via interface board $242_{2-T}$ and interface board $242_{2-R}$, respectively. Each transceiver 38 of FIG. 2 thus comprises a subrack which includes a transmitter board 260, a receiver board 270, and amplifiers and filters board 280.

In one example embodiment, base station (BS) node 28 is an ATM-based node, with interface boards 242 performing various ATM interfacing functions. The transmitter boards 260 and receiver boards 270 each include several devices. For example, each transmitter board 260 includes unillustrated elements such as an interface connected to its corresponding interface board 242; an encoder; a modulator; and, a baseband transmitter. In addition, the transmitter board 260 includes the transmitter/receiver sources which it shares with receiver board 270, including a radio frequency transmitter. Each receiver board 270 includes unillustrated elements such as an interface connected to its corresponding interface board 242; a decoder; a demodulator; and, a baseband receiver. Each amplifiers and filters board 280 includes amplifiers, such as MCPA and LNA amplifiers.

FIG. 8 illustrates, in somewhat more detail, an example non-limiting RNC node 26 of the present invention. It so happens that the RNC node 26 of FIG. 8 is a switched-based node having a switch 120. The switch 120 serves to interconnect other constituent elements of RNC node 26. Such other constituent elements include extension terminals $122_1$ through $122_n$, as well as extension terminal 124. Extension terminals $122_1$ through $122_n$ essentially function to connect RNC node 26 to the base stations 28 served by RNC node 26; extension terminal 124 connects RNC node 26 across the Iu interface to the core network.

Yet other constituent elements of RNC node 26 include diversity handover unit 126; codex 130; timing unit 132; a data services application unit 134; and, a main processor 140. For the FIG. 5A embodiment, the function 106A for determining control parameters for the radio link set can be situated, for example, in main processor 140.

As utilized herein in its various context, the term "algorithm" is not to be strictly construed as a computer program-type algorithm. For example, the term "in-and-out-of-synchronization detection algorithm" refers broadly to any technique or structure for accomplishing a similar objective, including individual hardware circuits, ASICs, DSPs, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use in a Radio Access Network of a telecommunications system, a method comprising deriving control parameters for controlling an in-and-out-of-synchronization detection algorithm for a radio link set from corresponding cell based parameters, the radio link set being a set of radio links which are combined in a softer handover operation performed at a base station of the Radio Access Network;

wherein the control parameters for controlling the in-and-out-of-synchronization detection algorithm for the radio link set are derived from the corresponding cell based parameters of the cells of the individual Radio Links of the radio link set;

wherein the control parameters are derived by taking the lowest value of the corresponding cell based parameters.

2. For use in a Radio Access Network of a telecommunications system, a method comprising deriving control parameters for controlling an in-and-out-of-synchronization detection algorithm for a radio link set from corresponding cell based parameters, the radio link set being a set of radio links which are combined in a softer handover operation performed at a base station of the Radio Access Network;

wherein the control parameters for controlling the in-and-out-of-synchronization detection algorithm for the radio link set are derived from the corresponding cell based parameters of the cells of the individual Radio Links of the radio link set; and, wherein the control parameters are derived by taking a weighed or non-weighed average value of the corresponding cell based parameters.

3. A radio access network of a telecommunications system comprising:

an in-and-out of synchronization detector which judges reception quality of a connection with a mobile user equipment unit;

a control parameter determination function which determines control parameters to be utilized by the in-and-out of synchronization detector, the control parameter determination function determining the control parameters for a radio link set from corresponding cell based parameters, the radio link set being a set of radio links which are combined in a softer handover operation performed at a base station of the Radio Access Network;

wherein the control parameter determination function derives the control parameters for controlling the in-and-out-of-synchronization detector for the radio link set from the corresponding cell based parameters of the cells of the individual Radio Links of the radio link set; and, wherein the control parameters are derived by taking the lowest value of the corresponding cell based parameters.

4. A radio access network of a telecommunications system comprising:
   an in-and-out of synchronization detector which judges reception quality of a connection with a mobile user equipment unit;
   a control parameter determination function which determines control parameters to be utilized by the in-and-out of synchronization detector, the control parameter determination function determining the control parameters for a radio link set from corresponding cell based parameters, the radio link set being a set of radio links which are combined in a softer handover operation performed at a base station of the Radio Access Network;

wherein the control parameter determination function derives the control parameters for controlling the in-and-out-of-synchronization detector for the radio link set from the corresponding cell based parameters of the cells of the individual Radio Links of the radio link set; and, wherein the control parameters are derived by taking a weighed or non-weighed average value of the corresponding cell based parameters.

* * * * *